United States Patent [19]
Morita

[11] Patent Number: 5,195,774
[45] Date of Patent: Mar. 23, 1993

[54] AIR BAG ATTACHING STRUCTURE

[75] Inventor: Kazuo Morita, Shiga, Japan

[73] Assignee: Takata Corporation, Tokyo, Japan

[21] Appl. No.: 788,769

[22] Filed: Nov. 7, 1991

[30] Foreign Application Priority Data

Nov. 30, 1990 [JP] Japan .................. 2-334589
Nov. 30, 1990 [JP] Japan .................. 2-334590

[51] Int. Cl.$^5$ ........................................ B60R 21/16
[52] U.S. Cl. ............................ 280/731; 280/732
[58] Field of Search ............... 280/728, 731, 732, 743

[56] References Cited

U.S. PATENT DOCUMENTS

| | | | |
|---|---|---|---|
| 4,830,401 | 5/1989 | Honda | 280/736 |
| 4,887,842 | 12/1989 | Sato | 280/731 |
| 5,064,218 | 11/1991 | Hartmeyer | 280/743 |
| 5,066,039 | 11/1991 | Shitanoki et al. | 280/743 |
| 5,071,161 | 12/1991 | Mahon et al. | 280/743 |

FOREIGN PATENT DOCUMENTS

| | | |
|---|---|---|
| 380699 | 2/1990 | European Pat. Off. . |
| 0364267 | 4/1990 | European Pat. Off. . |
| 0380699 | 8/1990 | European Pat. Off. . |
| 0469734 | 2/1992 | European Pat. Off. . |
| 2-133266 | 5/1990 | Japan . |
| 2-162134 | 6/1990 | Japan . |
| 9009295 | 8/1990 | PCT Int'l Appl. . |
| 1531069 | 11/1978 | United Kingdom . |
| 2237249 | 5/1991 | United Kingdom . |
| 90/15713 | 12/1990 | World Int. Prop. O. . |

Primary Examiner—Kenneth R. Rice
Attorney, Agent, or Firm—Kanesaka and Takeuchi

[57] ABSTRACT

An air bag attaching structure of an air bag device is embodied by securing an air bag capable of inflating in response to the gas from an inflator at a marginal portion of a gas introducing opening of the air bag. The opening marginal portion of the air bag has a portion molded of synthetic resin or a sheet made of synthetic resin, or is impregnated with synthetic resin.

14 Claims, 9 Drawing Sheets

' # 5,195,774

AIR BAG ATTACHING STRUCTURE

FIELD OF THE INVENTION

This invention relates to an air bag attaching structure of an air bag device whose air bag expands to protect an occupant when a vehicle collides.

RELATED ART

An air bag device mounted to a car body in front of a seat operates such that in case of emergency, for example, when a vehicle collides, an air bag inflates and expands instantly in response to the pressure of a reaction gas discharged from a generator secured to a steering wheel or dashboard, thereby protecting an occupant.

FIG. 9 is a sectional view showing a conventional air bag device, and FIG. 10 is an enlarged sectional view showing the portion A of FIG. 9.

In these drawings, 10 is a retainer or an air bag attaching member, and an inflator 14 is fitted in an inflator attaching opening 12 formed at the center of the retainer 10.

An air bag 16 is formed with an accepting opening 18 in which the working end of the inflator 14 is fitted, this accepting opening 18 being aligned with the attaching opening 12. The accepting opening 18 serves also as a gas introducing opening for introduction of the gas discharged from the inflator 14 into the air bag 16. The air bag 16 is secured to the retainer 10 by pressing a marginal portion of the accepting opening 18 of the air bag against a marginal portion of the attaching opening 12 by means of a holding ring 20.

The air bag 16 is expandably folded and covered with a module cover 22. This module cover 22 ruptures in response to the inflating pressure of the air bag 16 that takes place when the air bag 16 is expanded by the gas discharged from the inflator 14.

The holding ring 20 is generally secured to the retainer 10 by rivets, especially, blind rivets 24 or screws (not shown). Or, stud bolts which are secured to the holding ring 20 and passed through boltholes of the retainer 10 as to project downward in FIG. 9 are used. Such bolts are used preferably in attaching the inflator to the retainer.

In the foregoing air bag attaching structure of the conventional air bag device, the air bag is formed with holes in which fixing elements, such as rivets, screws or bolts are inserted, and the retainer has holes formed therein correspondingly to the holes of the air bag in which the fixing elements are also inserted. Therefore, when assembling the air bag device, the bolts, screws or rivets must be inserted after the fixing elements insertion holes of the air bag are aligned with those of the retainer. However, it is very difficult to bring the holes of the air bag made of cloth into strict alignment with those of the retainer. Consequently, a marginal portion of a hole of the cloth-made air bag is liable to enter the corresponding hole of the retainer. Accordingly, the conventional air bag attaching structure of the air bag device is poor in the efficiency of assembly of the air bag device.

OBJECT AND SUMMARY OF THE INVENTION

It is an object of the present invention to provide an air bag attaching structure of an air bag device wherein an air bag is reinforced so that its attaching strength is high.

It is another object of the present invention to provide an air bag attaching structure of an air bag device which reduces the number of rivets, screws or others for attachment of an air bag to a retainer, and makes it possible to enhance the efficiency of manufactured and to reduce the cost of parts.

It is still another object of the present invention to provide an air bag attaching structure of an air bag device which eliminates or simplifies a sewing step conventionally performed with respect to a marginal portion of a gas introducing opening of an air bag, thus makes it possible to save labor and to automate the manufacturing process of the air bag.

To accomplish the foregoing objects, the present invention provides an air bag attaching structure of an air bag device as follows.

That is, according to a first feature of the present invention, an air bag attaching structure of an air bag device wherein an air bag capable of inflating in response to the gas from an inflator is secured at a marginal portion of a gas introducing opening of the air bag, is characterized in that the marginal portion of the gas introducing opening of the air bag has a portion molded of synthetic resin.

According to a second feature of the present invention, an air bag attaching structure of an air bag device wherein a marginal portion of an inflator accepting opening of an air bag is aligned with and secured to a marginal portion of an inflator attaching opening of a retainer, is characterized in that the opening marginal portion of the air bag has a sheet made of synthetic resin.

According to a third feature of the present invention, an air bag attaching structure of an air bag device wherein a marginal portion of an inflator accepting opening of an air bag is aligned with a marginal portion of an inflator attaching opening of a retainer, the opening marginal portion of the air bag is pinched between a holding ring and the retainer, and the holding ring is secured to the retainer by a plurality of bolts, is characterized in that the opening marginal portion of the air bag has a sheet made of synthetic resin.

According to a fourth feature of the present invention based on the third feature, an air bag attaching structure of an air bag device is characterized in that the sheet has a plurality of protrusions which are engaged in a corresponding plurality of engaging portions provided in at least either the holding ring or the retainer.

According to a fifth feature of the present invention based on any one of the second through fourth features, an air bag attaching structure of an air bag device is characterized in that the sheet is provided on each face of the marginal portion of the inflator accepting opening of the air bag, the marginal portion of the inflator accepting opening of the air bag is formed with a plurality of through holes, and the two sheets on both faces are made integral together by synthetic resin filling the inside of each through hole.

According to a sixth feature of the present invention based on the fifth feature, an air bag attaching structure of an air bag device is characterized in that a reinforcing member is embedded in the one sheet provided inside the air bag.

According to a seventh feature of the present invention based on the sixth feature, an air bag attaching structure of an air bag device is characterized in that the reinforcing member includes a plurality of bolts.

According to an eighth feature of the present invention based on the first feature, an air bag attaching structure of an air bag device is characterized in that a plurality of bolts for securing the air bag are embedded in the resin-molded portion.

According to a ninth feature of the present invention based on the first feature, an air bag attaching structure of an air bag device is characterized in that the opening marginal portion of the air bag has a seam which projects from the cloth surface of the air bag.

According to a tenth feature of the present invention based on any one of the second through seventh features, an air bag attaching structure of an air bag device is characterized in that a reinforcing cloth is superposed on the marginal portion of the inflator accepting opening of the air bag.

According to an eleventh feature of the present invention, an air bag attaching structure of an air bag device wherein an air bag capable of inflating in response to the gas from an inflator is secured at a marginal portion of a gas introducing opening of the air bag, is characterized in that the marginal portion of the gas introducing opening of the air bag is impregnated with synthetic resin.

According to a twelfth feature of the present invention, an air bag attaching structure of an air bag device wherein a marginal portion of an inflator accepting opening of an air bag is aligned with a marginal portion of an inflator attaching opening of a retainer, the opening marginal portion of the air bag is pinched between a holding ring and the retainer, and the holding ring is secured to the retainer by a plurality of bolts, is characterized in that the opening marginal portion of the air bag is impregnated with synthetic resin.

According to a thirteenth feature of the present invention based on the twelfth feature, an air bag attaching structure of an air bag device is characterized in that a reinforcing cloth is superposed on the marginal portion of the inflator accepting opening of the air bag, and bonded to the air bag by the synthetic resin impregnated into the reinforcing cloth.

As will be appreciated, in the air bag attaching structure of the air bag device according to the present invention, since the marginal portion of the gas introducing opening of the air bag has the portion molded of synthetic resin or is impregnated with synthetic resin, the air bag has rigidity in its opening marginal portion, thereby facilitating the step of securing the air bag.

In the air bag attaching structure of the air bag device according to the present invention, since the marginal portion of the inflator accepting opening of the air bag has the sheet made of synthetic resin or is impregnated with synthetic resin, the air bag has rigidity in its opening marginal portion, whereby any portion of the air bag is prevented from entering the holes of the retainer. Thus, the air bag device can be assembled in a short time.

In the air bag attaching structure of the air bag device according to the present invention, since the marginal portion of the inflator accepting opening of the air bag is reinforced by the sheet made of synthetic resin, the opening marginal portion of the air bag is firmly secured by the elements passed therethrough, such as pins, bolts or screws. In the air bag attaching structure of the air bag device according to the third feature, for example, the force of causing the marginal portion of the inflator accepting opening of the air bag to come off between the holding ring and the retainer during the inflating of the air bag is widely distributed by means of the sheet, whereby the opening marginal portion of the air bag is surely prevented from coming off. Of course, the opening marginal portion is reinforced.

In the air bag attaching structure of the air bag device according to the fourth feature, the sheet has the protrusions. The force of causing the marginal portion of the inflator accepting opening of the air bag to come off between the holding ring and the retainer during the inflating of the air bag is opposed by the protrusions. Therefore, due to a number of protrusions provided, the opening marginal portion of the air bag is surely prevented from coming off during the inflating of the air bag.

In the air bag attaching structure of the air bag device according to the fifth feature, the sheet is provided on each face of the marginal portion of the inflator accepting opening of the air bag, and the two sheets are made integral together by the synthetic resin filling the through holes of the air bag. Therefore, the strength of coupling between the sheets and the basic material of the air bag is very high.

In the air bag attaching structure of the air bag device according to the sixth feature based on the fifth feature since the reinforcing member is embedded in the sheet provided inside the air bag, the strength of the sheet is very high.

In the air bag attaching structure of the air bag device according to the seventh or eighth feature, the sheet or resin-molded portion includes the bolts by which the air bag is secured to the retainer and the inflator is secured to the retainer.

In the air bag attaching structure of the air bag device according to the ninth feature, since the seam projects from the cloth surface of the air bag, it is caught in the resin-molded portion. Therefore, when external forces are applied to the interface between the air bag and the molded portion in the directions parallel to the interface during the inflating of the air bag, the seam surely prevents relative slipping between them.

In the air bag attaching structure of the air bag device according to the tenth or thirteenth feature, since the reinforcing cloth is provided, the strength of the section of the inflator accepting opening of the air bag is high.

In the air bag attaching structure of the air bag device according to the tenth feature, if the reinforcing cloth is impregnated with synthetic resin when the sheets are formed, it can be coupled to the air bag cloth without sewing. Or, if the reinforcing cloth is sewed to the air bag cloth such that the seam projects from the cloth surface, there is provided substantially the same effect as that of the ninth feature.

In the air bag attaching structure of the air bag device according to the thirteenth feature, since the reinforcing cloth is impregnated with synthetic resin, it can be coupled to the air bag cloth without sewing. Of course, the reinforcing cloth may be sewed to the air bag cloth.

DESCRIPTION OF THE PREFERRED EMBODIMENTS

Embodiments of the present invention will now be described with reference to the drawings.

Figure 1:
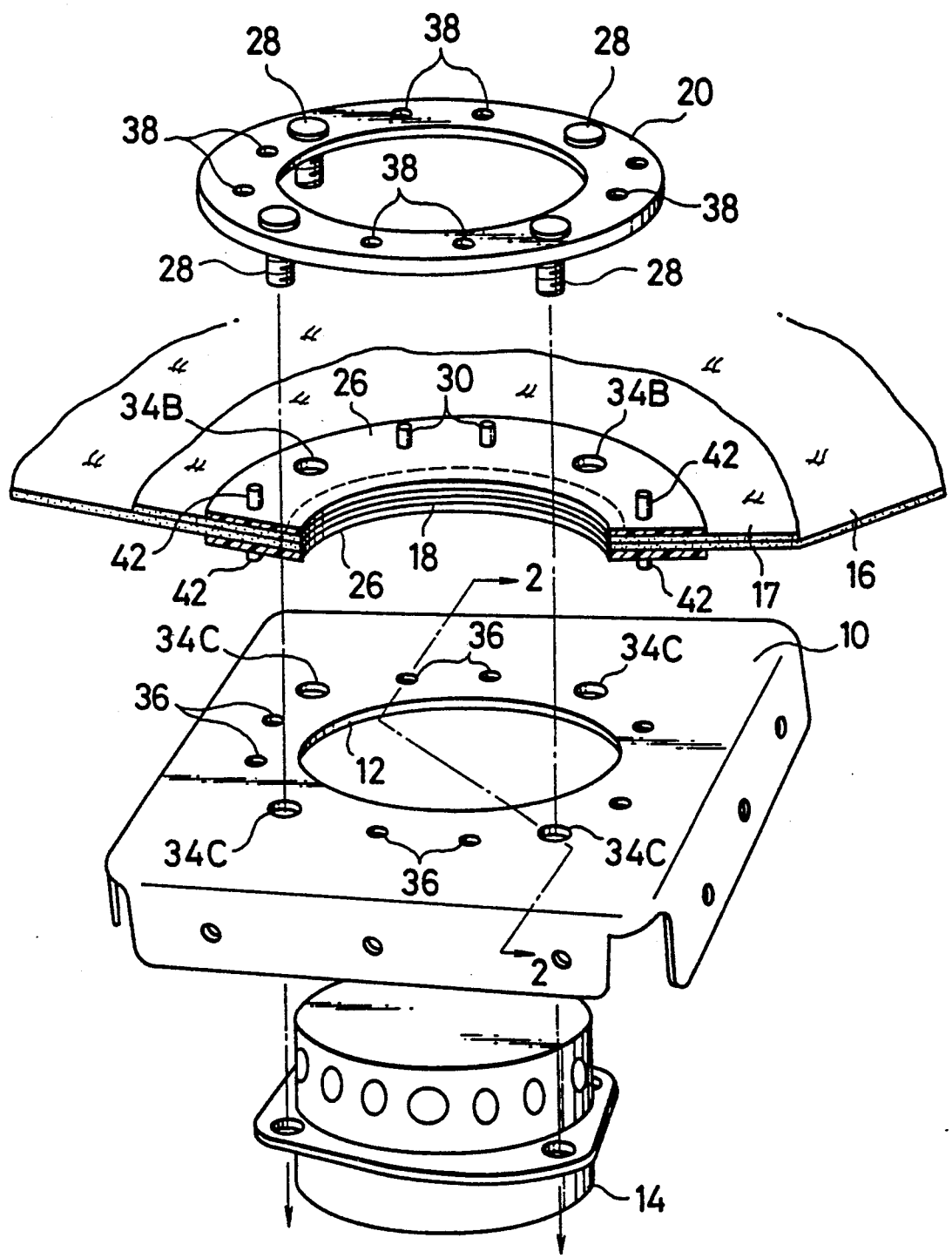
FIG. 1 is an exploded perspective view showing an embodiment of the present invention.
Figure 2:
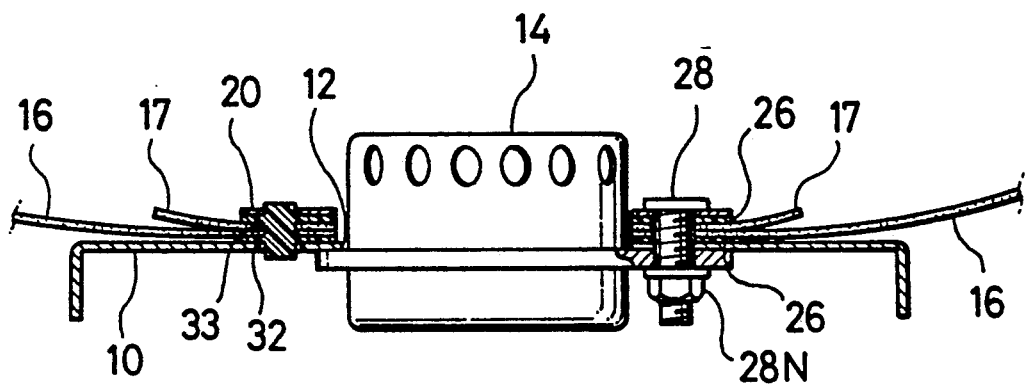
FIG. 2 is a sectional view taken along the line 2—2 of FIG. 1.

FIG. 1 is an exploded perspective view showing an embodiment of an air bag attaching structure of an air bag device according to the present invention, and FIG. 2 is a sectional view taken along the line 2—2 of FIG. 1.

In this embodiment, a ring-shaped reinforcing cloth 17 is provided on a marginal portion of an inflator accepting opening or a gas introducing opening 18 of an air bag 16. A ring-shaped thin sheet 26 is provided on each face of the opening marginal portion, which is formed by injection molding of synthetic resin. The ring-shaped sheet 26 has eight protrusions 30. The air bag 16 and the reinforcing cloth 17 have through holes 32, 33 formed therein correspondingly to the protrusions 30, and these through holes 32 and 33 are filled with synthetic resin by injection molding, so that the two ring-shaped sheets 26 are made integral together with the air bag 16 pinched between them.

A holding ring 20 has stud bolts 28 the number of which is four in the embodiment.

The ring-shaped sheets 26, the air bag 16 and a retainer 10 are each formed with four boltholes 34B, 34C in which the stud bolts 28 are inserted. The retainer 10 and the holding ring 20 are formed with eight holes 36, 38 in which the eight protrusions 30 are engaged, these defining engaging portions.

The air bag 16 with the ring-shaped sheets 26 provided thereon is placed on the retainer 10 such that the inflator accepting opening 18 becomes concentric with an inflator attaching opening 12 of the retainer 10, and then, the holding ring 20 is superposed from above. The stud bolts 28 are inserted in the bolt holes 34B and 34C, and the protrusions 30 are inserted in the holes 36 and 38. Then, the inflator is attached to the retainer 10 by the use of the stud bolts 28. That is, inflator securing nuts 28N are firmly tightened to the stud bolts 28 and as a result, the inflator is rigidly attached to the retainer 10, and the air bag 16 is pinched between the holding ring 20 and the retainer 10.

For the purpose of attachment of the air bag 16, the rigidity of the marginal portion of the inflator accepting opening 18 of the air bag 16 is increased by incorporation of synthetic resin and therefore, the holes 34B and the holes 34C can readily be aligned positionally together, this increasing the efficiency of assembly work.

In the foregoing air bag attaching structure, the air bag 16 has the ring-shaped sheets 26 formed by injection molding, this reinforcing the marginal portion of the inflator accepting opening 18 of the air bag 16 and distributing a force, which acts on the opening marginal portion 18 of the air bag 16 to cause the air bag to come off, over the whole opening marginal portion and therefore, the air bag is surely prevented from coming off and breaking down.

As clear from FIGS. 1 and 2, this embodiment uses no blind rivets, this eliminating a riveting step. Therefore, the efficiency of manufacture is increased and the cost of rivet material is decreased. As will be appreciated, since the protrusions 30 are engaged with the engaging portions i.e., holes 36 and 38, even when the air bag 16 is going to come off between the holding ring 20 and the retainer 10 during its expansion, the force of causing the air bag 16 to come off is opposed by the protrusions 30 and therefore, the air bag is surely prevented from coming off.

FIGS. 3 through 8 are perspective views showing other embodiments of the present invention.

Figure 3:
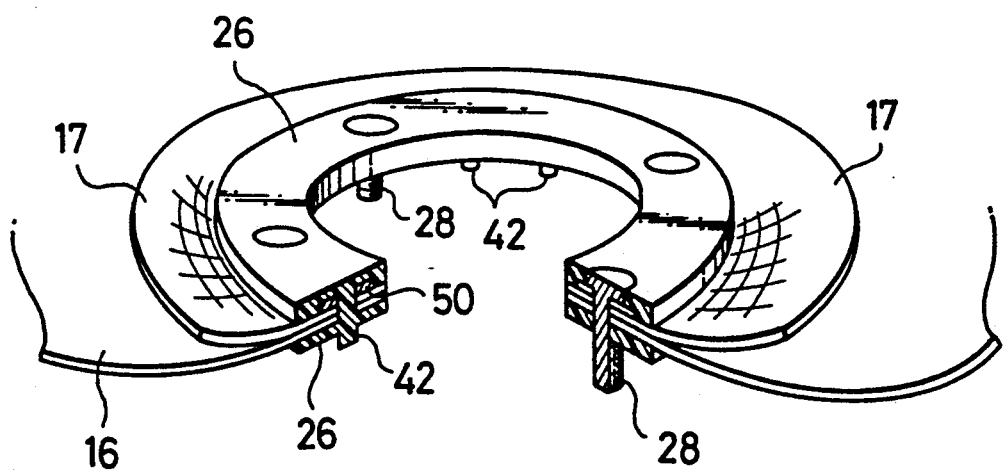
FIGS. 3 through 8 are perspective views showing other embodiments.

In FIG. 3, the ring-shaped sheet 26 provided inside the air bag 16 has a reinforcing member, for example, a metallic ring 50 embedded therein, this increasing the strength and rigidity of the ring-shaped sheet 26.

Further, the holding ring 20 is omitted, and the bolts 28 are embedded in the ring-shaped sheet 26 together with the reinforcing member 50 and therefore, when attaching the air bag 16 to the retainer 10, the bolts 28 can be inserted into the holes 34C at the same time. This modification decreases the number of assembling steps and the number of parts.

Figure 4:
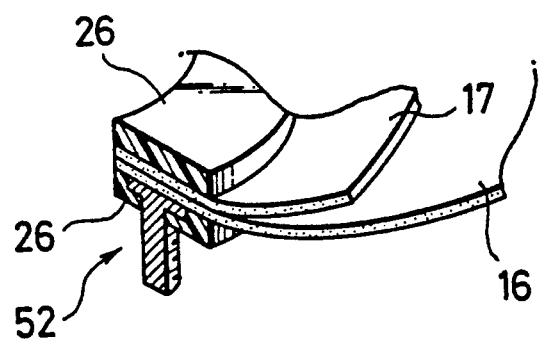
Figure 5:
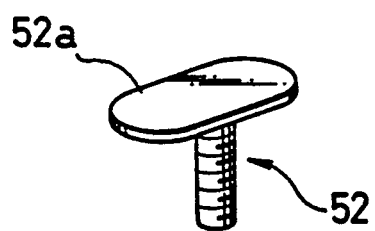

In FIG. 4, the ring-shaped sheet 26 provided outside the air bag 16 has bolts 52 whose heads are embedded. This bolt 52 has a plate-shaped head 52a as shown in FIG. 5, this increasing the strength of embedment. The structure of FIG. 4 needs no holding ring 20.

Figure 6:
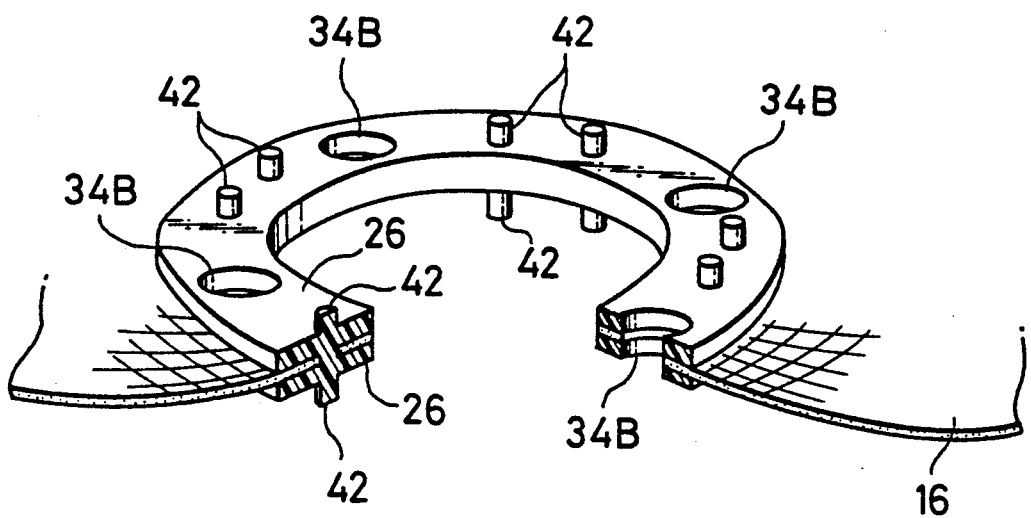

In FIG. 6, the reinforcing cloth 17 is omitted. The reason is that the strength of the marginal portion of the inflator accepting opening 18 of the air bag 16 is sufficiently high.

Figure 7:
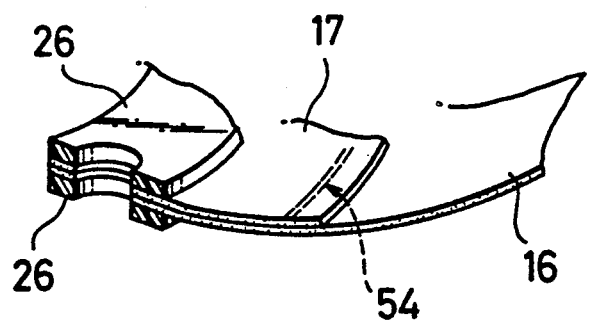

In FIG. 7, an outer peripheral portion of the reinforcing cloth 17 is sewed to the air bag 16. 54 is a seam.

Figure 8:
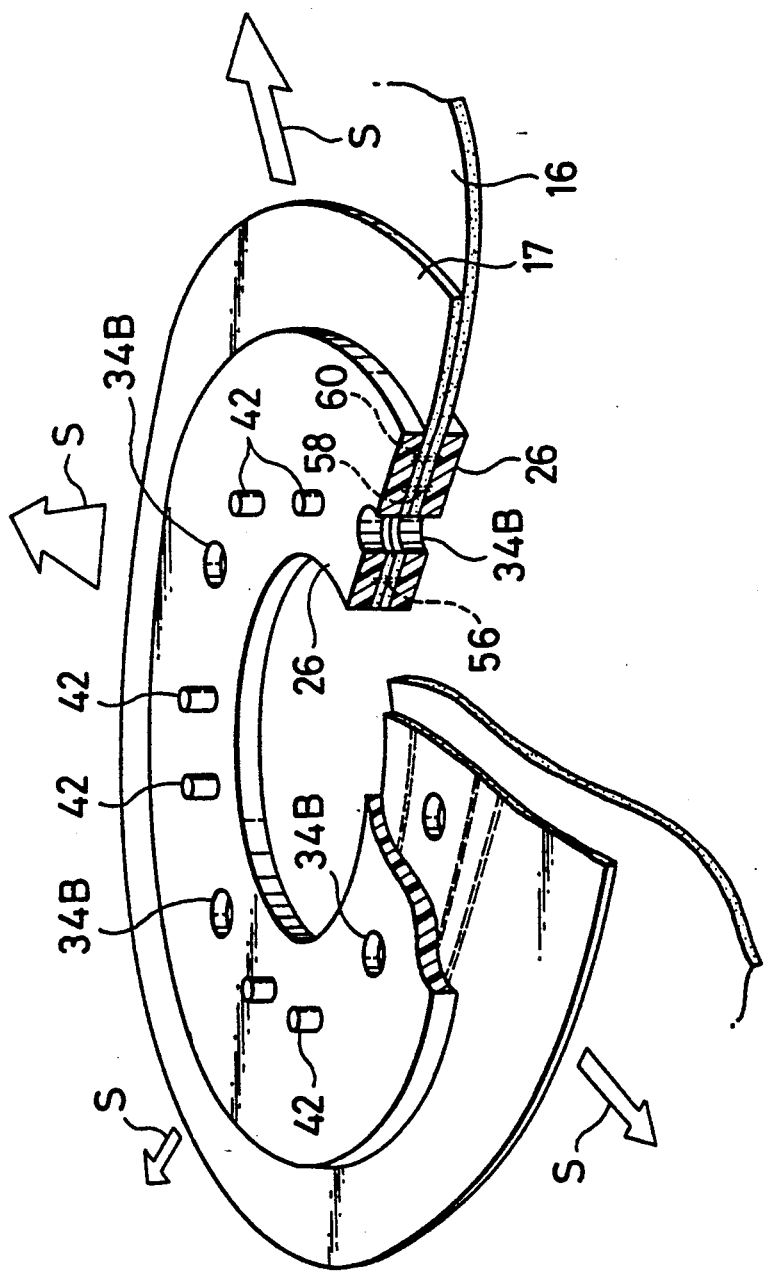
Figure 9:
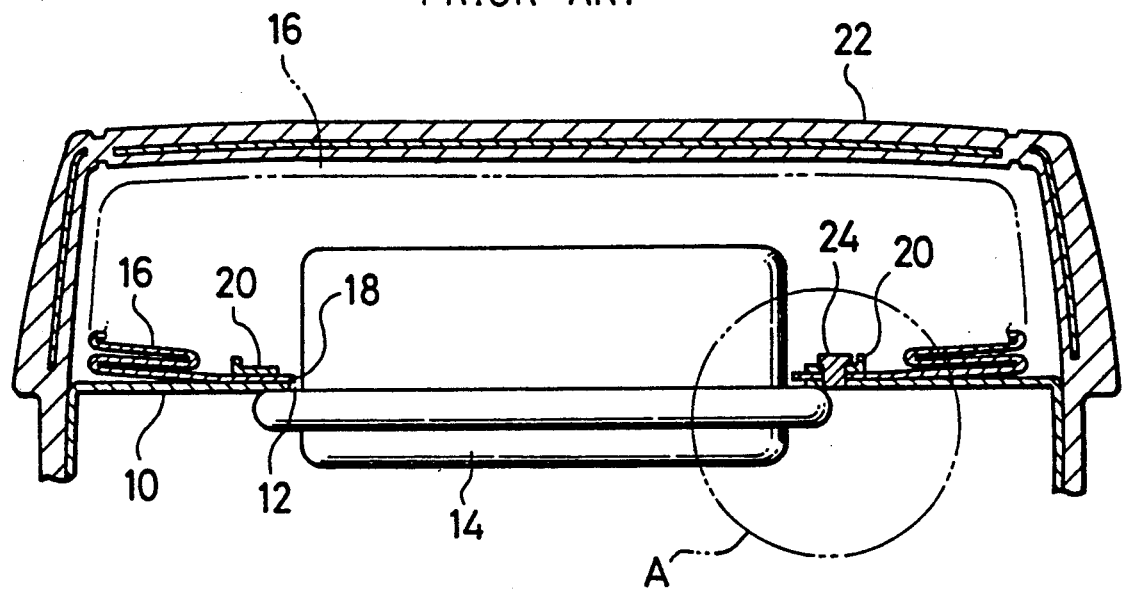
FIG. 9 is a sectional view showing a conventional air bag device.
Figure 10:
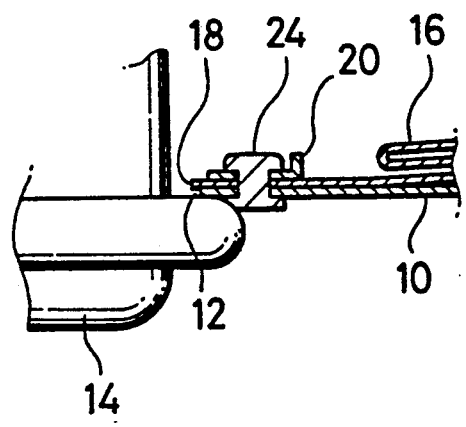
FIG. 10 is a fragmentary enlarged view corresponding to FIG. 9.

In FIG. 8, the reinforcing cloth 17 is sewed to the air bag 16 by an inner seam 56 which is closer to the center than the bolt holes 34B and outer seams 58 and 60.

Since the seams 56 through 60 are made as to project from the cloth surface, after injection molding they are embedded in the ring-shaped sheets 26. Therefore, even when external forces in the directions of the arrows S shown in FIG. 8 are applied to the air bag 16 during its expansion such that large shearing stresses in directions parallel to the cloth surface arise between the ring-shaped sheets 26 and the cloth, the seams 56 through 60 are caught by the ring-shaped sheets 26 to oppose such shearing stresses. Accordingly, the coupling force between the ring-shaped sheets 26 and the air bag 16 or the reinforcing cloth 17 is very high.

Although the reinforcing cloth 17 is used in FIG. 8, it may be omitted if the seams 56 through 60 are provided. The number of seams may be one, two, four, or more. Further, all seams may be provided closer to the center than the boltholes 34B.

In FIGS. 3 through 8, components identical with or corresponding to those shown in FIG. 2 are designated by the same reference numerals as used in FIG. 2. The embodiments of FIGS. 3 through 8 each provide substantially the same effect as that of the embodiment of FIGS. 1 and 2.

Although the molding process of synthetic resin has been described as performed by injection molding, it should not be limited as above and may be performed by a different method of molding.

Figure 11:
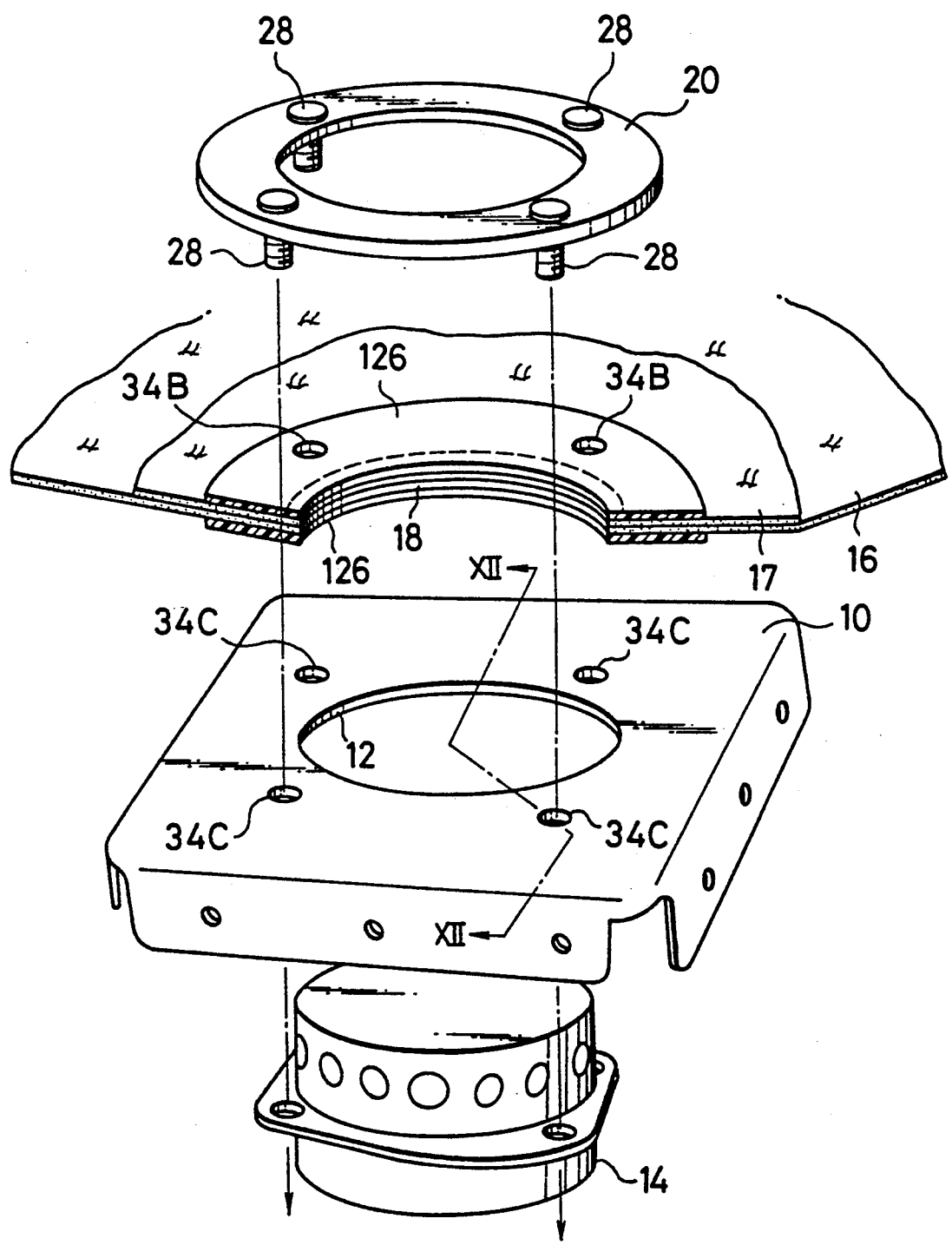
FIG. 11 is an exploded perspective view showing a further embodiment.
Figure 12:
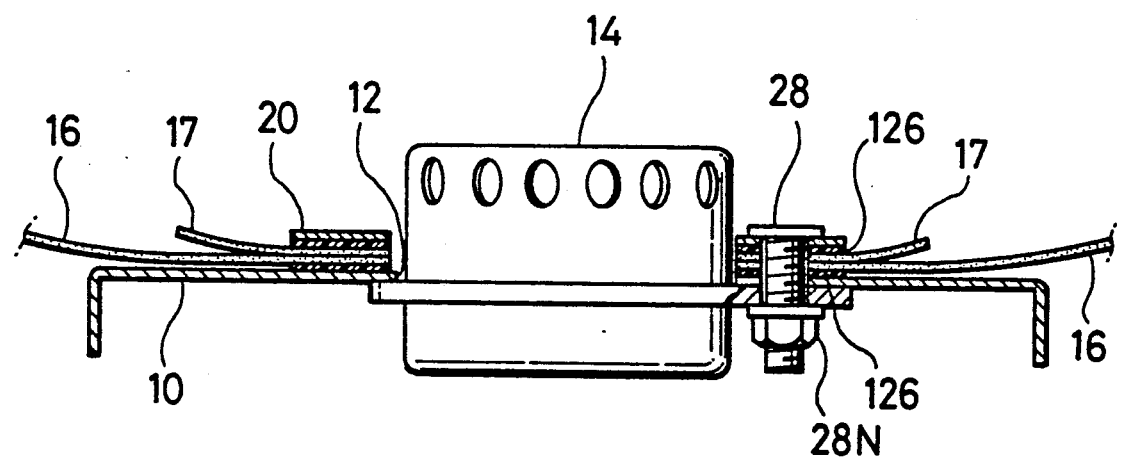
FIG. 12 is a sectional view taken along the line XII—XII of FIG. 11.

FIG. 11 is an exploded perspective view showing a further embodiment of the air bag attaching structure of the air bag device according to the present invention, and FIG. 12 is a sectional view taken along the line XII—XII of FIG. 11.

In this embodiment, the ring-shaped reinforcing cloth 17 is provided on the marginal portion of the inflator accepting opening or the gas introducing opening 18 of the air bag 16. Each face of the opening marginal portion is impregnated with synthetic resin, so that a thin rigid plate-like portion 126 is formed there (which is referred to as a ring-shaped sheet).

The holding ring 20 has the stud bolts 28, the number of which is four in the embodiment.

The ring-shaped sheet 26, the air bag 16 and the retainer 10 are formed with the four bolt holes 34B, 34C in which the stud bolts 28 are inserted.

The air bag 16 with the ring-shaped sheets 126 provided thereon is placed on the retainer 10 such that the inflator accepting opening 18 becomes concentric with the inflator attaching opening 12 of the retainer 10, and then, the holding ring 20 is superposed from above. The stud bolts 28 are inserted in the bolt holes 34B and 34C and in the bolt holes of the inflator. Then, the nuts 28N are firmly tightened to the stud bolts 28, as a result, the inflator is rigidly attached to the retainer 10, and the air bag 16 is pinched between the holding ring 20 and the retainer 10.

This embodiment provides substantially the same effect as that of the embodiment of FIGS. 1 and 2.

Since the reinforcing cloth 17 is bonded to the air bag 16 by the synthetic resin impregnated into the reinforcing cloth, no sewing is necessary.

Figure 13:
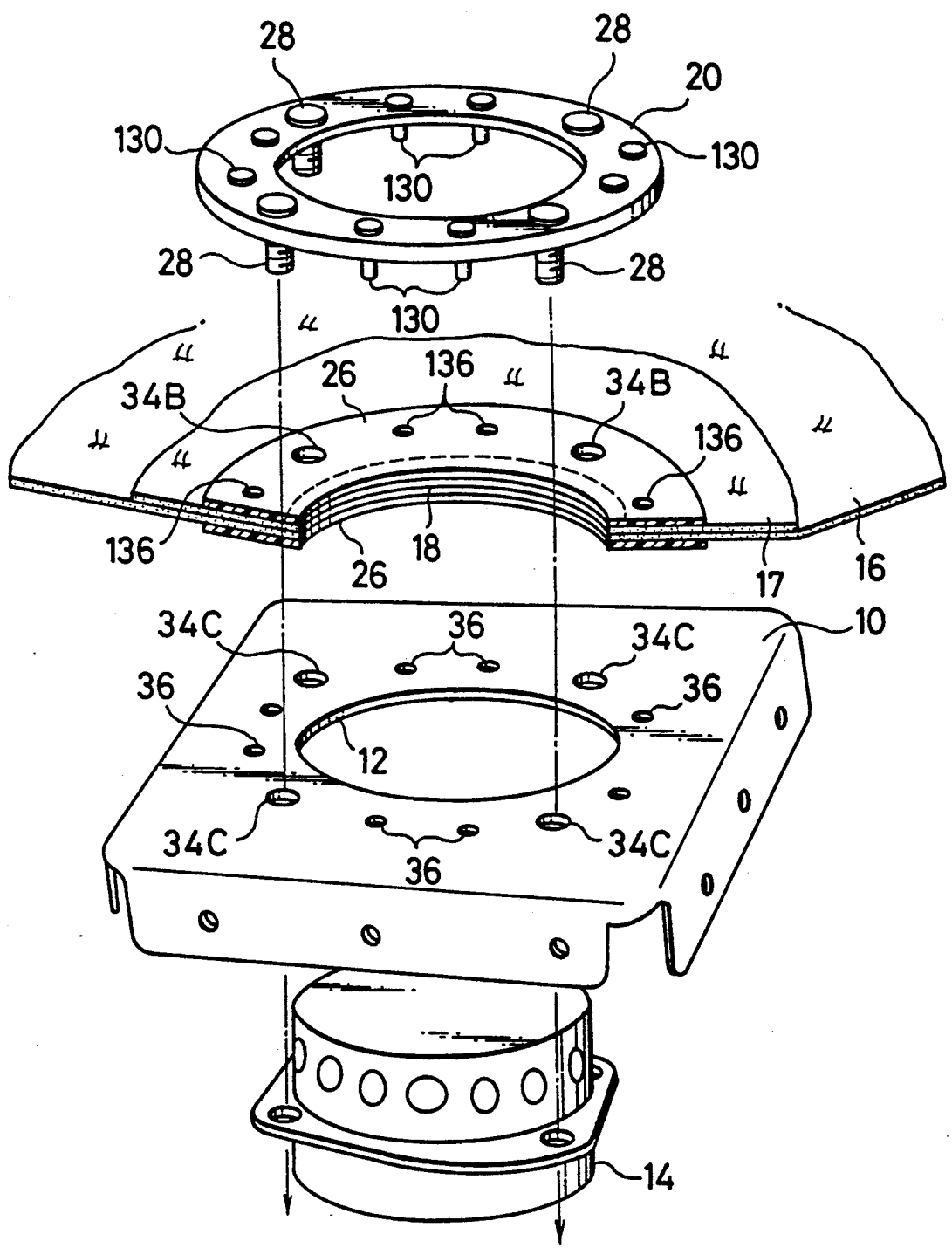
FIG. 13 is an exploded perspective view showing a further embodiment.

FIG. 13 shows a further embodiment of the air bag attaching structure according to the present invention. In this embodiment, the holding ring 20 has protrusions 130. Since these protrusions 130 are engaged with engaging portions i.e. holes 136 and 36 formed in the air bag 16 and the retainer 10, even when the air bag 16 is going to come off between the holding ring 20 and the retainer 10 during its expansion, the force of causing the air bag 16 to come off is opposed by the protrusions 130 and therefore, the air bag is surely prevented from coming off.

Although the reinforcing cloth 17 is used in this embodiment, it may be omitted. Further, the reinforcing cloth 17 may be sewed to the air bag. All seams may be provided closer to the center than the bolt holes 34B.

Although in the embodiments the holding ring 20 is secured to the retainer 10 with no use of blind rivets, a few rivets or screws may be used additionally.

Although the embodiments use the holes 36, 136 as the engaging portions, the present invention can use deep recesses or the like as the engaging portions.

What is claimed is:

1. An air bag attaching structure of an air bag device comprising:
    a retainer having an inflator attaching opening with a marginal portion,
    an air bag secured to the retainer, said air bag having a gas introducing opening, a marginal portion of the opening, and a plurality of through holes formed in the marginal portion, said marginal portion of the air bag being aligned with and secured to the marginal portion of the inflator attaching opening of the retainer, and
    synthetic resin sheets disposed on both faces of the marginal portion of the gas introducing opening of said air bag so that the synthetic resin sheets on both faces are secured to the marginal portion of the air bag by a synthetic resin filling the through holes formed in the marginal portion of the air bag.

2. An air bag attaching structure of an air bag device according to claim 1, further comprising a plurality of bolts for securing the air bag to the retainer, said bolts being embedded in the synthetic resin sheet.

3. An air bag attaching structure of an air bag device according to claim 1, further comprising a reinforcing member embedded in one of said sheets provided at said air bag to increase strength and rigidity of the sheet.

4. An air bag attaching structure of an air bag device according to claim 3, wherein the reinforcing member includes a plurality of bolts.

5. An air bag attaching structure of an air bag device according to claim 3, further comprising a holding ring with bolts for holding the marginal portion of the air bag to the marginal portion of the retainer by the bolts.

6. An air bag attaching structure of an air bag device according to claim 5, wherein the sheet has a plurality of protrusions and at least one of the holding ring and the retainer has a plurality of engaging portions, said protrusions engaging the engaging portions.

7. An air bag attaching structure of an air bag device comprising an air bag capable of inflating in response to gas ejected from an inflator adapted to be secured to the air bag, said air bag having a gas introducing opening with a marginal portion, said marginal portion having a portion molded of synthetic resin and a seam projecting from a cloth surface of the air bag.

8. An air bag attaching structure of an air bag device according to claim 7, further comprising a reinforcing cloth superposed on the marginal portion of the gas introducing opening of the air bag.

9. An air bag attaching structure of an air bag device wherein an air bag capable of inflating in response to the gas from an inflator is secured to a marginal portion of a gas introducing opening of the air bag, characterized in that the marginal portion of the gas introducing opening of the air bag is impregnated with synthetic resin.

10. An air bag attaching structure of an air bag device wherein a marginal portion of an inflator accepting opening of an air bag is aligned with a marginal portion of an inflator attaching opening of a retainer, the opening marginal portion of the air bag is pinched between a holding ring and the retainer, and the holding ring is secured to the retainer by a plurality of bolts, characterized in that the opening marginal portion of the air bag is impregnated with synthetic resin.

11. An air bag attaching structure of an air bag device according to claim 10, wherein a reinforcing cloth is superposed on the marginal portion of the inflator accepting opening of the air bag, and bonded to the air bag by the synthetic resin impregnated into the reinforcing cloth.

12. An air bag attaching structure of an air bag device comprising:
    an inflator having a lateral flange and a head portion,
    a retainer having a central opening, a marginal portion around the central opening, a front face and a back face, the head portion of said inflator passing through the central opening when the device is assembled so that the lateral flange of the inflator contacts the back face of the marginal portion of the central opening,
    an air bag having a gas introducing opening for introducing gas from said inflator, and a marginal portion of the opening to contact the front face of the marginal portion of the central opening, a holding ring for pinching the marginal portion of the gas introducing opening of the air bag to the marginal portion of the central opening, securing means for securing said holding ring to said retainer, a ring-shape resin sheet for imparting rigidity to the marginal portion of the gas introducing opening, said resin sheet being attached to the marginal portion so that said air bag is readily attached to the retainer and the marginal portion of the gas introducing opening is prevented from entering the central opening of the retainer, and a reinforcing member embedded in the sheet to increase strength and rigidity of the sheet.

13. An air bag attaching structure of an air bag device according to claim 12, wherein the sheet and the air bag are each formed with a plurality of through holes in which a plurality of bolts for securing the opening marginal portion to the retainer are inserted.

14. An air bag attaching structure of an air bag device, comprising:

an inflator having a lateral flange and a head portion, a retainer having a central opening, a marginal portion around the central opening, a front face and a back face, the head portion of said inflator passing through the central opening when the device is assembled so that the lateral flange of the inflator contacts the back face of the marginal portion of the central opening, an air bag having a gas introducing opening for introducing gas from said inflator, and a marginal portion to contact the front face of the marginal portion of the central opening, a holding ring for pinching the marginal portion of the gas introducing opening of the air bag to the marginal portion of the central opening, securing means for securing said holding ring to said retainer, and a synthetic resin material impregnated into the marginal portion of the gas introducing opening of the air bag for giving rigidity to the marginal portion of the gas introducing opening of the air bag so that the air bag is readily attached to the retainer and the marginal portion of the gas introducing opening is prevented from entering the central opening of the retainer.

* * * * *